J. H. DODSON.
SLACK ADJUSTER.
APPLICATION FILED APR. 27, 1908.
914,024.
Patented Mar. 2, 1909.
2 SHEETS—SHEET 1.
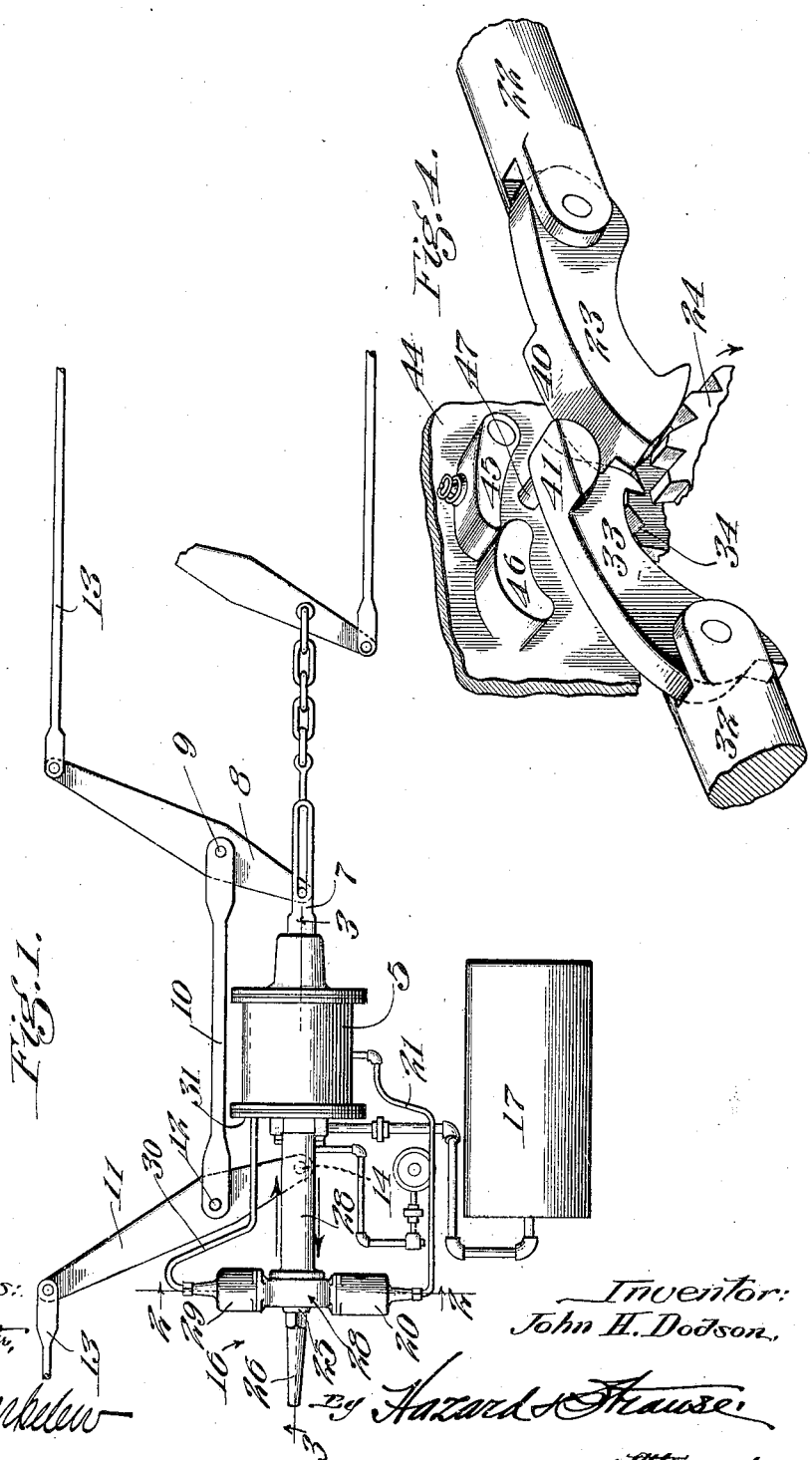
Witnesses:
Inventor:
John H. Dodson,
by Hazard & Krause,
Attorneys J. H. DODSON.
SLACK ADJUSTER.
APPLICATION FILED APR. 27, 1908.
914,024.
Patented Mar. 2, 1909.
2 SHEETS—SHEET 2.
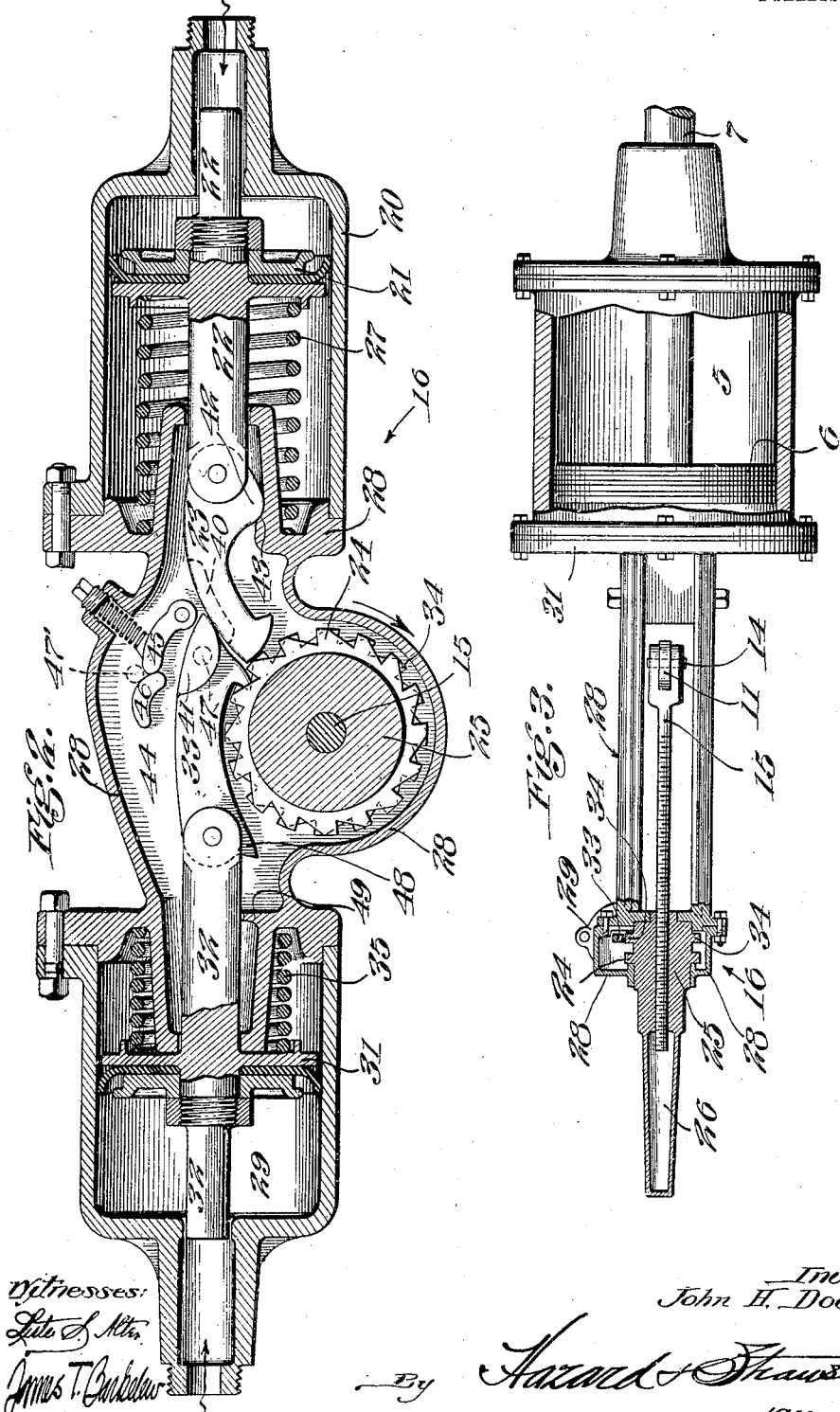

UNITED STATES PATENT OFFICE.

JOHN H. DODSON, OF LOS ANGELES, CALIFORNIA, ASSIGNOR OF ONE-HALF TO CHRESTUS A. TRIPP, OF REDLANDS, CALIFORNIA, AND ONE-FOURTH TO J. FRANK BRAZELTON, OF LOS ANGELES, CALIFORNIA.

SLACK-ADJUSTER.

No. 914,024.     Specification of Letters Patent.     Patented March 2, 1909.

Application filed April 27, 1908. Serial No. 429,315.

*To all whom it may concern:*

Be it known that I, JOHN H. DODSON, a citizen of the United States, residing at Los Angeles, in the county of Los Angeles and State of California, have invented new and useful Improvements in Slack-Adjusters, of which the following is a specification.

This invention relates to improvements in slack adjusters for the standard air brake system and the object thereof is to provide a mechanism whereby the adjustment of the slack of the brake levers is rendered entirely automatic.

The standard slack adjuster now in use is adapted only to operate the brake levers automatically in one direction, to take up slack. The amount of slack varies in the lever system under different conditions of train movement being always less while the train is standing than when running. Further, the renewal of worn brake shoes greatly decreases the amount of slack and the adjuster now in use is incapable of automatically increasing the slack to allow the piston to have its normal amount of travel. For these reasons the braking power varies, being insufficient at some times and too heavy at others so as to cause flat wheels and many other inconveniences.

This invention consists of a mechanism operating in conjunction with the standard slack adjuster to increase the amount of slack in the brake levers whenever it becomes necessary to do so. In this manner the slack is adjusted from time to time as such adjustment is needed, the adjustment being entirely automatic in both directions.

In providing the mechanism I have made use of the standard slack adjuster with such few changes as renders it operable in conjunction with the new mechanism. The two mechanisms are so connected together that one or the other operates every time the piston in the brake cylinder moves. Thus the amount of slack is adjusted for each individual application of the brakes and is kept at such an amount as will insure uniform brake piston travel and consequent brake shoe pressure.

I accomplish the above by means of the device described herein and illustrated in the accompanying drawings, in which:—

Figure 1,— is a diagrammatic plan view of the brake system equipped with the improved slack adjuster. Fig. 2,— is an enlarged cross-section of the adjuster taken on line 2—2 of Fig. 1. Fig. 3,— is an enlarged section taken on line 3—3 of Fig. 2. Fig. 4,— is a perspective view of the pawls and the mechanism operating immediately in conjunction with them.

In Fig. 1 the usual brake cylinder 5 is illustrated provided with piston 6 mounted on rod 7 connecting with brake lever 8 in the usual manner. Brake lever 8 is pivoted at 9 to a connecting bar 10 at whose other end a similar brake lever 11 is pivoted at 12. The outer ends of both brake levers are connected to brake rods 13 and the inner end of lever 11 is pivoted at 14 to a screw shaft 15 operated longitudinally by slack adjuster 16. The usual reservoir 17 is illustrated and also the system of connections now in use.

Referring particularly to Figs. 2 and 3, cylinder 20 is the one corresponding to the usual slack adjuster cylinder now in use and is connected by a pipe 21 to cylinder 5 at a point along its longitudinal wall, piston 6 uncovering the opening of pipe 21 and allowing air to pass through the pipe into cylinder 20 when piston 6 has moved a predetermined distance in cylinder 5. Mounted in cylinder 20 is a piston 21 on piston rod 22 which carries at its outer end a pawl 23 adapted to engage a ratchet 24 on an enlarged hub 25 through which shaft 15 passes in screw threaded engagement. This hub is provided with the usual cap 26 to cover and protect the end of shaft 15. When piston 21 is forced forwardly by air pressure behind it from cylinder 5 pawl 23 is forced over the teeth of ratchet 24 to engage therewith and rotate the ratchet upon the return movement of the piston. A coiled spring 27 returns piston 21 to its normal position when the air pressure is removed behind it and pawl 23 engages with the teeth of ratchet 24 for rotation in the direction indicated by the arrows. Rotation in this direction moves the shaft 15 toward the observer in Fig. 2, or in the direction indicated by the lower arrow in Fig. 1, thus tightening the system of levers and shortening the slack.

The above described construction and operation are common to the typical slack adjuster now in use. The following portions appertain directly to the novel elements which I have imported into combination with the construction just described. On the other side of frame 28 which supports cylinder 20, and directly opposite it, is a cylinder 29 of a construction similar to that of cylinder 20. This cylinder 29 is connected by a small pipe 30 to cylinder 5 at a point behind piston 6 therein, this connection being conveniently made on cylinder head 31. Upon the admission of pressure to cylinder 5 pressure is also immediately admitted through pipe 30 to cylinder 29 behind piston 31 mounted on piston rod 32 therein. Piston rod 32 is provided with a pivoted pawl 33 on its end adapted to engage with the teeth of ratchet 34 mounted upon hub 25 along side the ratchet 24. From the drawings it will be seen that the teeth of the two ratchets are turned in opposite directions so that, when pawl 33 is retracted by the action of spring 35 against piston 31, hub 25 will be rotated in a direction reverse to that indicated by the arrows and shaft 15 will be moved away from the observer in Fig. 2, or in the direction indicated by the upper arrow in Fig. 1. This operation will loosen the system of brake levers and lengthen the amount of slack, consequently allowing the piston in the brake cylinder a longer travel.

The operation of the parts so far described take place as follows:—Upon the admission of pressure to the brake cylinder piston 31 is immediately pushed forward into the position shown in Fig. 2 of the drawings, this position being maintained until the pressure is released from the brake cylinder 5. Upon the release of this pressure spring 35 forces pawl 33 rearwardly and ratchet 34 is thereby rotated to move shaft 15. As before explained this movement of shaft 15 increases or lengthens the amount of slack. Unless hindered by the intervening mechanism about to be explained, this operation will take place upon every admission of pressure to the brake cylinder and the amount of slack will be continually increased and the piston travel correspondingly lengthened. When the piston travel has been increased to such an extent that the piston passes the point of connection of pipe 21 to the cylinder the air pressure is admitted through pipe 21 to cylinder 20 to actuate piston 21 therein. Pawl 23 is thereby forced over ratchet 24 and, upon the release of pressure from the brake cylinder, the pawl is forced rearwardly by spring 27 and ratchet 24 is rotated to decrease the amount of slack in the lever system as before explained. This operation will take place every time the brake piston passes the point of connection of pipe 21, this point being placed at a position on cylinder 5 such that piston 6 shall have the desired travel. It will be seen however, that pawl 33 would also be in action as it operates every time pressure is admitted to the brake cylinders regardless of the amount of piston travel and that therefore pawls 33 and 23 would act in opposite directions upon their respective ratchets and there would be no movement of hub 25. To obviate this action a means is provided for throwing pawl 33 out of engagement with ratchet 34 every time pawl 23 is operated, thereby allowing pawl 23 opportunity to shorten the slack and decrease the piston travel. This mechanism consists of a lug 40 on pawl 23 adapted to pass under a lug 41 on pawl 33 and to lift pawl 33 out of engagement with its ratchet whenever pawl 23 is forced forwardly. To assist in this lifting action pawl 23 is provided with an extending curved lug 42 on its lower face which acts in conjunction with curved recess 43 in frame 28 so that, upon its forward movement, its outer end is forced upwardly to raise pawl 33 quickly out of engagement with ratchet 34. Pivotally mounted upon side wall 44 of frame 28 is a spring pressed, or gravity operated, detent 45. This detent normally rests upon a projecting curved shelf 46 secured upon wall 44 and projecting pin 47 on pawl 33 is adapted to be raised under detent 45 and force it aside to arrive at the position shown in dotted lines at 47' in Fig. 2. Pawl 33 will thus be held in a raised position until the pressure is removed from the brake cylinder when it will be forced rearwardly by spring 35. Shelf 46 is of such a length that it will hold the pawl out of engagement with ratchet 34 upon its rearward movement and the pawl will thus arrive at its inoperative position without operating the ratchet to increase the slack. A small projection 48 is provided on the pivoted end of pawl 33 to engage with shoulder 49 on frame 28 and raise the pawl out of engagement with its ratchet when in its inoperative position. Thus, with both pawls out of engagement with the ratchet, hub 25 may be rotated manually to adjust the amount of slack if it becomes necessary to do so.

From the foregoing description it will be seen that I have provided a mechanism which is entirely automatic in the adjustment of the amount of slack in the brake levers and that it will adjust itself upon each and every operation of the brakes, one or the other of the adjusting mechanisms always operating. By this means many inconveniences are avoided as the piston travel is kept constant and the braking power consequently maintained at a uniform amount.

Having described my invention what I claim as new and desire to secure by Letters Patent is:—

1. A slack adjuster adapted to operate in conjunction with a brake cylinder and piston, comprising brake cylinder pressure controlled means to let out slack in combination with piston travel controlled means to take in slack.

2. A slack adjuster, comprising automatic means to let out slack in combination with automatic means to take in slack and to render inoperative the automatic means to let out slack.

3. A slack adjuster, comprising automatic slack lengthening mechanism, automatic slack shortening mechanism, and means to throw said slack lengthening mechanism out of operation upon the actuation of said slack shortening mechanism.

4. A slack adjuster adapted to operate in conjunction with a brake cylinder and piston connected to brake levers, comprising an automatic slack lengthening mechanism, an automatic slack shortening mechanism adapted to operate when the piston passes a predetermined point in the cylinder, and means to render said slack lengthening mechanism inoperative upon the actuation of said slack shortening mechanism.

5. A slack adjuster adapted to operate in conjunction with a brake cylinder and piston connected to brake levers, comprising a slack lengthening cylinder connected to the brake cylinder behind the brake piston, a piston in said cylinder, mechanism operated by said piston to lengthen the slack of the brake levers, a slack shortening cylinder connected to the brake cylinder at a point on its longitudinal wall, a piston in said cylinder, mechanism operated by said piston to shorten the slack of the brake levers, and means operated by said slack shortening mechanism to render inoperative said slack lengthening mechanism.

6. In a slack adjuster, a ratchet and pawl mechanism for lengthening the slack, ratchet and pawl mechanism for shortening the slack, and means to throw said lengthening mechanism out of engagement upon the operation of said shortening mechanism.

7. A slack adjuster adapted to operate in conjunction with a brake cylinder and piston connected to brake levers, comprising a slack lengthening cylinder connected to the brake cylinder behind the brake piston, a piston in said cylinder, ratchet and pawl mechanism for lengthening the slack of the brake levers, said mechanism connected to said piston, a slack shortening cylinder connected to the brake cylinder at a point on its longitudinal wall, a piston in said cylinder, ratchet and pawl mechanism for shortening the slack of the brake levers, said mechanism connected to said piston, and means operated by said slack shortening mechanism to throw said slack lengthening mechanism out of engagement.

8. A slack adjuster adapted to operate in conjunction with a brake cylinder and piston connected to brake levers, comprising means to increase slack upon the brake applying movement of the piston, and means to decrease slack controlled by the piston travel.

In witness that I claim the foregoing I have hereunto subscribed my name this 20th day of April, 1908.

J. H. DODSON.

Witnesses:
 EDMUND A. STRAUSE,
 OLLIE PALMER.